US00RE46305E

(19) United States
(12) Reissued Patent
Byeon

(10) Patent Number: US RE46,305 E
(45) Date of Reissued Patent: Feb. 14, 2017

(54) AIRTIGHT COSMETIC CONTAINER

(71) Applicant: Jae Sam Byeon, Sejong-si (KR)

(72) Inventor: Jae Sam Byeon, Sejong-si (KR)

(21) Appl. No.: 15/055,273

(22) Filed: Feb. 26, 2016

Related U.S. Patent Documents

Reissue of:
(64) Patent No.: 9,210,984
Issued: Dec. 15, 2015
Appl. No.: 14/355,763
PCT Filed: Oct. 31, 2012
PCT No.: PCT/KR2012/009035
§ 371 (c)(1),
(2) Date: May 1, 2014
PCT Pub. No.: WO2013/066035
PCT Pub. Date: May 10, 2013

(30) Foreign Application Priority Data

Nov. 2, 2011 (KR) ..... 10-2011-0113400
Oct. 29, 2012 (KR) ..... 10-2012-0120337

(51) Int. Cl.
*A45D 33/00* (2006.01)
*A45D 33/22* (2006.01)
*A45D 40/22* (2006.01)

(52) U.S. Cl.
CPC ..... *A45D 33/00* (2013.01); *A45D 33/006* (2013.01); *A45D 40/221* (2013.01); *A45D 2200/051* (2013.01)

(58) Field of Classification Search
CPC ..... A45D 33/00; A45D 33/006
USPC .... 220/366.1, 592.2; 132/293–295, 300, 305
See application file for complete search history.

(56) References Cited

U.S. PATENT DOCUMENTS 2,823,249 A * 2/1958 Curtiss ..... 174/87
3,117,619 A * 1/1964 Williams ..... 220/783
3,117,691 A 1/1964 Williams
5,425,469 A * 6/1995 Freedland ..... 220/495.11
5,875,795 A * 3/1999 Bouix ..... 132/293
5,875,918 A * 3/1999 Sheffler et al. ..... 220/783
5,896,866 A * 4/1999 Quennessen ..... 132/293
6,076,679 A * 6/2000 Yuhara et al. ..... 206/581
6,138,686 A * 10/2000 Yuhara ..... 132/294
(Continued)

FOREIGN PATENT DOCUMENTS

JP 2000-225020 A 8/2000
KR 20-0200762 10/2000
(Continued)

*Primary Examiner* — Beverly M Flanagan
(74) *Attorney, Agent, or Firm* — Novick, Kim & Lee, PLLC; Sang Ho Lee

(57) ABSTRACT

An airtight cosmetic container in which an inner container (200) and an inner cover (300) can be airtightly sealed without using a separate rubber seal while compensating for a diameter deviation caused by a molding error of the inner cover (300). The inner container (200) includes a packing case (220) in which a cosmetic tray is installed, and which includes inner and outer elastic sidewalls (222, 223) that form a seal groove (221) therebetween, so a sealing rib (320) of the inner cover (300) is inserted into the seal groove (221), with inner and outer curved protrusions (222a, 223a) protruding toward each other on opposed surfaces of the inner and outer elastic sidewalls so as to come into elastic close contact with the inner and outer circumferential surfaces of the sealing rib (320) inserted in the seal groove (221), thereby realizing an airtight sealing effect.

18 Claims, 16 Drawing Sheets

(56) References Cited

U.S. PATENT DOCUMENTS

| | | | | |
|---|---|---|---|---|
| 6,354,308 | B1 | 3/2002 | Kuk | |
| 7,798,319 | B1 * | 9/2010 | Bried | A24F 23/00 131/352 |
| 2007/0029226 | A1 * | 2/2007 | Yuhara et al. | 206/581 |

FOREIGN PATENT DOCUMENTS

| | | | |
|---|---|---|---|
| KR | 20-0200762 | Y1 | 10/2000 |
| KR | 20-0372923 | | 1/2005 |
| KR | 20-0372923 | Y1 | 1/2005 |
| KR | 20-0429553 | | 10/2006 |
| KR | 20-0429553 | Y1 | 10/2006 |
| KR | 10-0653639 | | 12/2006 |
| KR | 10-0653639 | B1 | 12/2006 |
| KR | 20-0438483 | | 2/2008 |
| KR | 20-0438483 | Y1 | 2/2008 |
| KR | 10-1033005 | | 5/2011 |
| KR | 10-1033005 | B1 | 5/2011 |

* cited by examiner

AIRTIGHT COSMETIC CONTAINER

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS REFERENCE TO RELATED APPLICATIONS*

*This application is a reissue application of U.S. application Ser. No. 14/355,763 filed on May 1, 2014, which was issued as U.S. Pat. No. 9,210,984 on Dec. 15, 2015, and is a national-stage entry under 35 USC 371 of PCT/KR2012/009035 filed on Oct. 31, 2012, which claims priority to Korean Patent Application Nos. 10-2012-0120337 and 10-2011-0113400 filed on Oct. 29, 2012, and Nov. 2, 2011, respectively, the contents of which are all hereby incorporated by reference herein in their entirety.*

TECHNICAL FIELD

The present invention relates, in general, to a cosmetic container having an airtight function and, more particularly, to an airtight cosmetic container in which an airtight sealing effect between an inner container and an inner cover can be realized without using a separate rubber seal (airtight seal member), and which can efficiently compensate for a difference of diameters between elements caused by a molding error of the inner cover, thereby always realizing airtight sealing of the inner container and efficiently preventing deformation of elements irrespective of use of the container over a long period of time, and easily opening and closing the container, and in which, when closing an outer lid, the inner cover comes into close contact with the inner container while expelling air from the inner container, thereby efficiently maintaining the desired airtight sealing effect of the container and providing products having improved qualities.

BACKGROUND ART

Generally, tinting cosmetic materials include volatile solvents therein, so, if a container that contains such a tinting cosmetic material therein fails to maintain a desired airtight sealing function while being kept, the cosmetic material may easily change in quality.

For example, when a cosmetic container that contains foundation used as a base for facial makeup fails to maintain an airtight sealing function, moisture and volatile ingredients of the foundation will vaporize, so the foundation may lose its intrinsic pleasant fragrance and may become hard and easily crack, and the expected life span of the foundation may be shortened.

In an effort to solve the problems, the cosmetic container for containing the tinting cosmetic material is typically configured to prevent the tinting cosmetic material contained therein from changing in quality by providing an airtight structure capable of airtightly closing the inner container when closing the outer lid of the cosmetic container.

In the related art, to provide cosmetic containers having airtight structures, various techniques are proposed. Conventional airtight cosmetic containers are classified into two types: a cosmetic container having a lock type opening/closing structure in which an outer lid hinged to an outer container is opened or closed by operating a lock provided in a part opposed to the outer lid, and a cosmetic container having a threaded type opening/closing structure in which an outer lid hinged to an outer container is opened or closed by rotating internal and external threads in a state in which the outer lid is being closed.

When compared to the latter container that is the container having the threaded type opening/closing structure, the former container that is the container having the lock type opening/closing structure is problematic in that the pressing force of a sealing rib provided in the outer lid is lower than the pressing force of the container having the threaded type opening/closing structure, so the airtight sealing effect formed between the outer lid and the inner container of the cosmetic container having the lock type opening/closing structure gradually becomes reduced. However, the cosmetic container having the lock type opening/closing structure is advantageous in that the outer lid can be easily and simply opened by a one-step process of pressing a button.

Accordingly, the most important technique required by the cosmetic container having the lock type opening/closing structure is a technique that can maximize the airtight sealing effect of the container which can isolate the content contained in the inner container from the environment.

In the conventional airtight cosmetic containers having the lock type opening/closing structures, the methods of realizing the airtight sealing effect of a cosmetic receiving container (inner container) that contains a cosmetic material therein are classified into two types: a first method in which the airtight sealing effect for the container is realized by compressing a hard rib integrated with an outer lid onto a rubber seal (airtight seal member), and a second method in which the airtight sealing effect of the container is realized by airtight contact formed by a combination of airtight contact parts of injection-molded elements.

The first method of realizing the airtight sealing effect using the rubber seal is problematic in that, although the method can provide desired airtight sealing effect within a predetermined initial period of time after a new container is used, the performance of the soft rubber seal may gradually change by the repeated compression of the hard plastic rib onto the rubber seal when repeatedly using the container over a long period of time, so the airtight function of the container will be gradually reduced.

The second method of realizing the airtight sealing effect using injection-molded elements is problematic in that, although the method can provide high work efficiency during a process of assembling the container because the method does not require a separate rubber seal, a seal seat for holding the rubber seal or a process of assembling the rubber seal with the seal seat, the method does necessarily require an airtight structure formed by the airtight contact parts that come into close contact with each other to realize the airtight sealing effect of an inner container (cosmetic receiving container) made of a plastic material (synthetic resin).

The present invention relates to an airtight cosmetic container having the lock type opening/closing structure which can realize a desired airtight sealing effect without using a separate rubber seal.

Examples of such airtight cosmetic containers may be referred to Korean Utility Model Registration No. 20-0200762 (registered on Aug. 11, 2000; patent document 1), and Korean Patent No. 10-1033005 (registered on Apr. 27, 2011; patent document 2).

Patent document 1 discloses a technique in which, when an upper case is closed, the sidewall of an inner cover comes into close and pressure contact with an outward inclined surface provided on an upper part of the outer circumferential surface of an inner container installed in a lower case, thereby realizing an airtight sealing effect for the interior of the inner container.

Patent document 2 discloses a technique in which a close contact rib is provided by extending downward from the lower surface of an inner cover that covers a cosmetic receiving chamber of an inner case, wherein the close contact rib is configured to be elastically bent outward and come into close contact with the inner circumferential surface of the sidewall of the cosmetic receiving chamber, thereby realizing an airtight sealing effect for the cosmetic receiving chamber of the inner case.

DISCLOSURE

Technical Problem

In patent document 1, an airtight sealing effect for the inner container is realized by the close and pressurized contact of the downward sidewall of the inner cover with the outward inclined surface provided on the upper part of the outer circumferential surface of the inner container. Here, the airtight structure of patent document 1 forms the airtight sealing effect by linear contact between the outward inclined surface of the inner container and the sidewall of the inner cover, so the technique of patent document 1 is problematic in that distortion may occur in the linear contact parts due to a variation in temperature and air pressure, thereby causing a part of the contact junction of the linear contact parts to become loose, thus deteriorating the airtight sealing effect.

Further, the function of the close contact rib disclosed in patent document 2 is to prevent a separation of the inner cover from the inner case even when an external shock is applied to the cosmetic container, thereby preventing a powdered cosmetic material from being discharged from the inner case. Here, the airtight structure of patent document 2 forms the airtight sealing effect by linear contact between the outward bent edge of the close contact rib of the inner cover and the inner circumferential surface of the sidewall of the inner case, so the technique of patent document 2 is problematic in that distortion may occur in the linear contact parts due to a variation in temperature and air pressure, thereby causing a part of the contact junction of the linear contact parts to become loose, thus deteriorating the airtight sealing effect.

In addition, when the outer lid is closed under pressure in a state in which the inner case is closed by the inner cover, air is not expelled from the cosmetic receiving chamber at the inner case, so the inner cover may become loose, thus deteriorating the airtight sealing effect.

Accordingly, the present invention has been made keeping in mind the above problems occurring in the prior art, and an object of the present invention is to provide an airtight cosmetic container, in which a downward extending sealing rib of an inner cover is inserted into a seal groove defined between inner and outer elastic sidewalls of a packing case of an inner container, and inner and outer curved protrusions that protrude toward each other on opposed surfaces of the inner and outer elastic sidewalls come into elastic close contact with the inner and outer circumferential surfaces of the sealing rib, thereby maximizing an airtight sealing effect while efficiently compensating for a diametrical error or a diameter deviation caused by a molding error of the inner cover.

Another object of the present invention is to provide an airtight cosmetic container, in which the packing case is configured such that the height of the inner elastic sidewall is lower than the height of the outer elastic sidewall, and in which the sealing rib is provided with a downward inclined surface on the inner circumferential surface thereof, so, when closing the inner cover, the sealing rib can be smoothly inserted into the seal groove while firstly the inclined surface of the sealing rib comes into contact with the inner curved protrusion of the inner elastic sidewall at a location near a hinged connection part, thereby pushing and expanding the inner curved protrusion, and secondarily the outer circumferential surface of the sealing rib comes into close contact with the outer curved protrusion of the outer elastic sidewall, thereby realizing a desired airtight sealing effect of the cosmetic container, and when opening the inner cover, the sealing rib is removed from the seal groove while firstly the outer circumferential surface of the sealing rib pushes the outer curved protrusion of the outer elastic sidewall, thereby expanding the outer curved protrusion, and secondarily the inclined surface of the sealing rib comes into contact with the inner curved protrusion of the inner elastic sidewall at the location near the hinged connection part, thereby efficiently dispersing the contact force during an operation of opening the inner cover, so the present invention can allow a user to easily open or close the inner cover of the airtight cosmetic container.

A further object of the present invention is to provide an airtight cosmetic container, in which the hinge bracket of an inner cover which is hinged to a hinge shaft set in the hinge bracket of the packing case is configured such that the diameter of a shaft hole of the hinge bracket of the inner cover is larger than the diameter of the hinge shaft set in the hinge bracket of the packing case, so, when the sealing rib of the inner cover is inserted into the seal groove of the packing case, the sealing rib can be easily inserted into the seal groove while compensating for a molding error (diameter deviation) of the inner cover.

Yet another object of the present invention is to provide an airtight cosmetic container, in which a reinforcing rim is formed on the outer elastic sidewall of the packing case so as to increase the elasticity of the outer elastic sidewall and to prevent deformation of the outer elastic sidewall, and which can efficiently resist elastic deformation of the sealing rib of the inner cover even when the sealing rib is repeatedly inserted into and removed from the seal groove of the packing case, thereby efficiently maintaining the airtight sealing effect of the container.

Technical Solution

In order to accomplish the above objects, the present invention provides an airtight cosmetic container, including: a container body; an inner container installed in the container body and containing a cosmetic material therein; an inner cover rotatably and openably combined with a side of the inner container and having a sealing rib that comes into close contact with an upper end surface of the inner container by a pressing force of a pressure protrusion; and an outer lid combined with a side recess of the container body by a hinge bracket and having a locking protrusion at a portion opposed to the hinge bracket so as to be locked to a locking step of a locking hole of a push button mounted to the container body at a portion opposed to the side recess, so, when the outer lid is closed, the outer lid brings the sealing rib into close contact with the inner container by pressing a pressure protrusion of the inner cover, and when the push button is pushed so as to release the locking protrusion, the outer lid is opened, wherein the inner container includes a cosmetic tray, and a packing case in which the cosmetic tray is installed and a hinge bracket is provided so as to be combined with a hinge bracket of the inner cover, wherein the packing case includes inner and outer elastic sidewalls that form a seal groove therebetween, so the sealing rib of the inner cover is inserted into the seal groove, with inner and outer curved protrusions protruding toward each other on opposed surfaces of the inner and outer elastic sidewalls so as to come into elastic close contact with inner and outer circumferential surfaces of the sealing rib inserted in the seal groove, thereby realizing an airtight sealing effect.

The inner elastic sidewall of the packing case may have a height lower than a height of the outer elastic sidewall, and the sealing rib of the inner cover may be provided with a downward inclined surface on the inner circumferential surface thereof so as to come into contact with the curved protrusion of the inner elastic sidewall.

Here, the inner curved protrusion of the inner elastic sidewall may be formed at a location near an upper end of an inlet of the seal groove, the outer curved protrusion of the outer elastic sidewall may be formed at a location lower than the inner curved protrusion such that the outer curved protrusion is opposed to the inner curved protrusion with a height difference defined between the curved protrusions, so the curved protrusions are brought into contact with the inner and outer circumferential surfaces of the sealing rib by a stepwise manner, thereby dispersing an opening/closing force, and realizing elastic contact with the inner and outer circumferential surfaces of the sealing rib in a closed state, and increasing the airtight sealing effect.

Further, the present invention may have an air vent groove on the inner circumferential surface of the outer elastic sidewall, so, when the outer lid is closed, the inner cover can come into close contact with the packing case of the inner container.

Further, the inner diameter of a shaft hole formed in the hinge bracket of the packing case may be larger the outer diameter of the hinge shaft set in the hinge bracket of the inner cover, so, when the inner cover is rotated, the hinge shaft can be moved in the shaft hole, thereby compensating for an eccentric error when the sealing rib is inserted into the seal groove.

Further, a reinforcing rim may be formed on the upper end part of the outer circumferential surface of the outer elastic sidewall, thereby providing a desired contact strength to the sealing rib of the inner cover and maintaining concentric combination of the sealing rib with the seal groove while preventing an eccentric deformation, and allowing the inner cover to be easily closed.

Further, the container body may include a lower case to which the push button is mounted, and an outer support case that is seated in a seat of the lower case and has a through hole through which the locking protrusion of the outer lid passes, and the packing case may be seated in the seat of the lower case in such a way that the outer elastic sidewall of the packing case is fitted and held in the inner circumferential surface of the outer support case, and the inner elastic sidewall of the packing case is held by the outer circumferential surface of an inner support case that is fitted over the outer circumferential surface of the cosmetic tray.

Further, to allow the inner and outer elastic sidewalls to be opened, the packing case may be assembled with the inner and outer support cases in such a way that a predetermined gap is defined between the inner and outer circumferential surfaces of the inner and outer elastic sidewalls and the inner and outer circumferential surfaces of the inner and outer support cases.

Further, the packing case may be made of a soft plastic material, ductility of which is lower than that of the material of the inner cover.

Advantageous Effects

The present invention is advantageous in that a desired airtight sealing effect for a cosmetic material contained in the inner container of the cosmetic container can be efficiently maintained over a long period of time by a combination of injection-molded elements without using a separate rubber seal (airtight seal member), and, even when the outer lid of the cosmetic container is repeatedly opened and closed so as to use the cosmetic material, the cosmetic container can efficiently maintain the desired airtight sealing effect, so the present invention can provide products having improved qualities.

Another advantage of the present invention resides in that the cosmetic container can be easily opened and closed without using a separate rubber seal, so the present invention can allow users to conveniently use cosmetic containers, and can produce cosmetic containers in commercial quantity due to a simple process of assembling the containers, thereby reducing the production cost of the containers.

A further advantage of the present invention resides in that, although there may be a diameter deviation of the inner cover due to an injection molding error, the packing case receives the sealing rib of the inner cover while efficiently compensating for the diameter deviation, thereby realizing a desired airtight sealing effect and ensuring reliability of products.

Still another advantage of the present invention resides in that, when closing the inner cover onto the packing case, air is expelled from the packing case, so the packing case can be airtightly sealed, thereby efficiently preventing the cosmetic material contained in the packing case from changing in quality and from discoloring, and preventing volatile ingredients of the cosmetic material from vaporizing even when the cosmetic material is kept in the container for a long period of time.

BEST MODE

The characteristic configuration of the present invention resides in that a desired airtight sealing effect for airtightly sealing a cosmetic material contained in an inner container (cosmetic receiving container) can be realized by a combination of injection-molded elements without using a separate rubber seal in such a way that, when closing an inner cover, a sealing rib extending downward from the lower surface of the inner cover is inserted into a seal groove of a packing case of the inner container while compensating for a molding error of the inner cover, and inner and outer curved protrusions that protrude inward oppositely from inner and outer elastic sidewalls forming the seal groove come into elastic close contact with the inner and outer circumferential surfaces of the sealing rib inserted into the seal groove.

Further, in the packing case, the inner curved protrusion of the inner elastic sidewall is formed at a location near an upper end of the inlet of the seal groove, the outer curved protrusion of the outer elastic sidewall is oppositely formed at a location lower than the inner curved protrusion with a predetermined height difference between the two curved protrusions, so the sealing rib can come into stepwise contact with the inner and outer circumferential surfaces, thereby efficiently dispersing the opening and closing forces and bringing the inner and outer circumferential surfaces of the sealing rib into elastic contact with the inner and outer curved protrusions, and maximizing the airtight sealing effect.

Further, when the outer lid is closed onto the packing case covered with the inner cover, air is expelled from the inner container by a compression force of the outer lid, thereby maximizing the airtight sealing effect.

Hereinbelow, the present invention will be described in detail with reference to the accompanying drawings.

Here, to efficiently describe the present invention, elements may be omitted, simplified or exaggerated in accompanying drawings, if the omitting, simplifying and exaggerating do not affect the right of the present invention.

Figure 1:
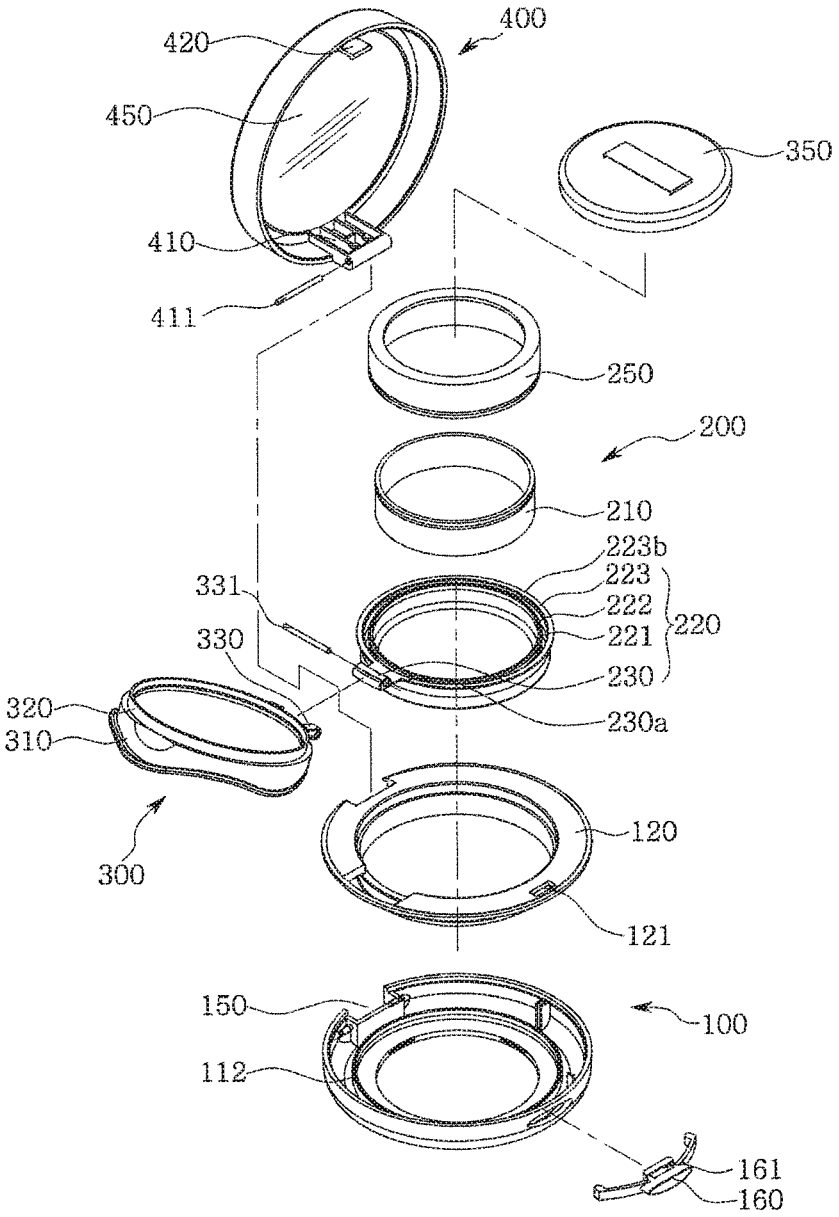
FIG. 1 is an exploded perspective view illustrating elements constituting an airtight cosmetic container of the present invention.
Figure 4:
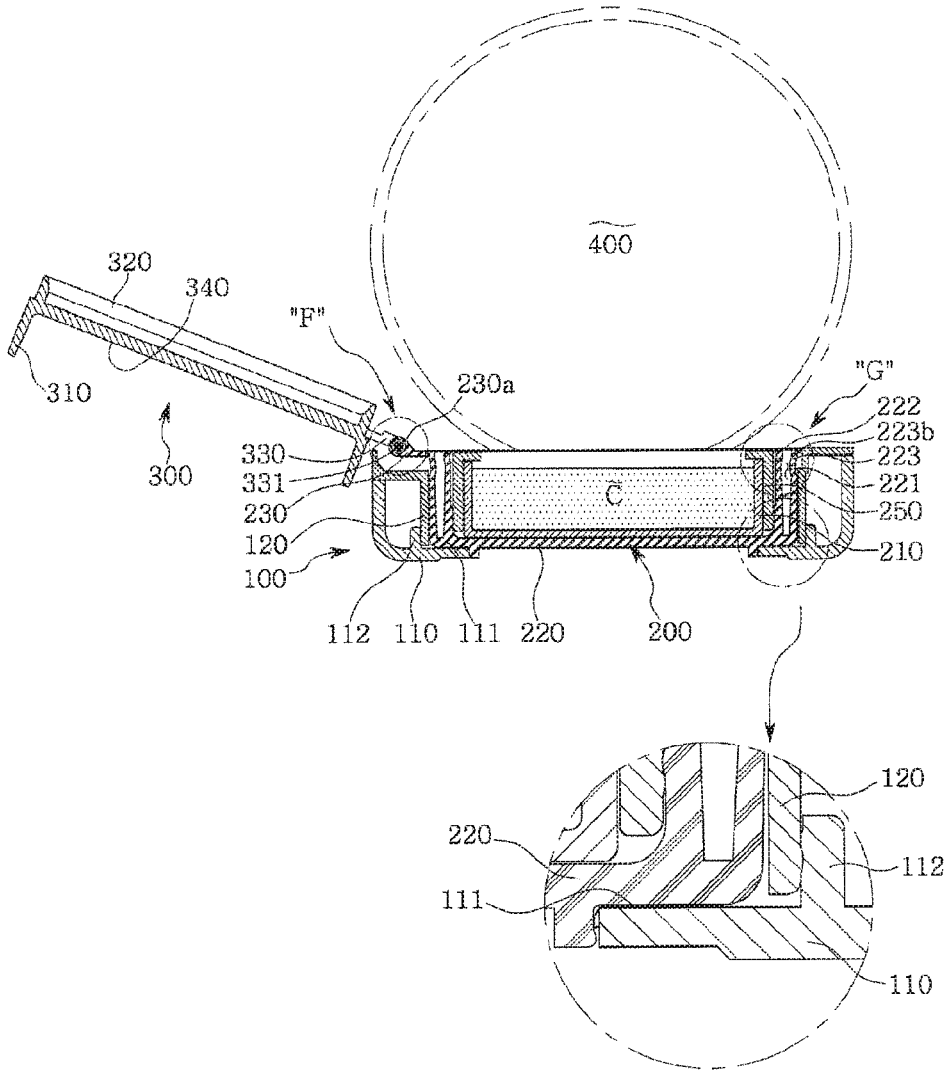
FIG. 4 is a sectional view illustrating the airtight cosmetic container of the present invention in which the outer lid and the inner cover are opened.
Figure 7:
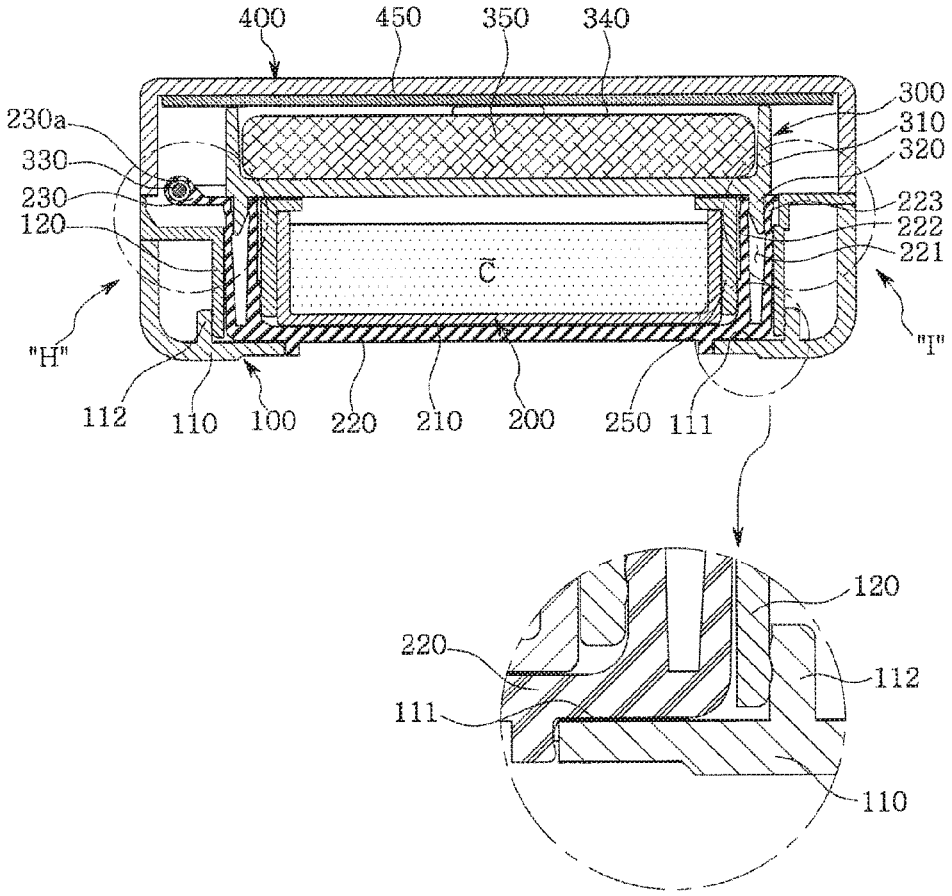
FIG. 7 is a sectional view illustrating the airtight cosmetic container of the present invention in which the outer lid and the inner cover are closed.
Figure 8:
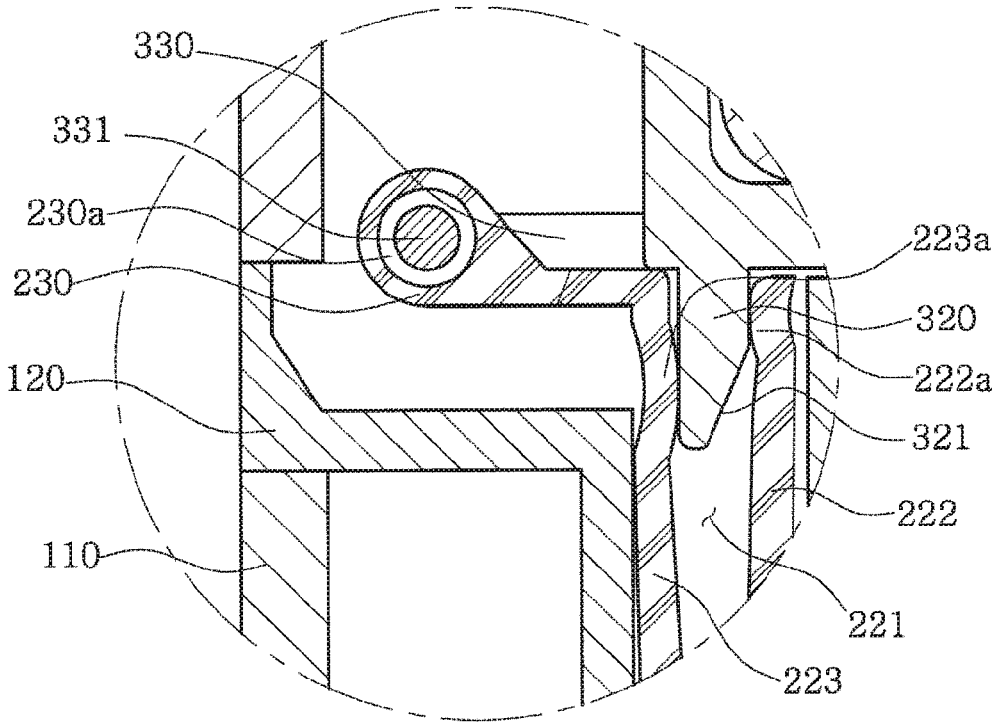
FIG. 8 is an enlarged view of portion H of FIG. 7.
Figure 9:
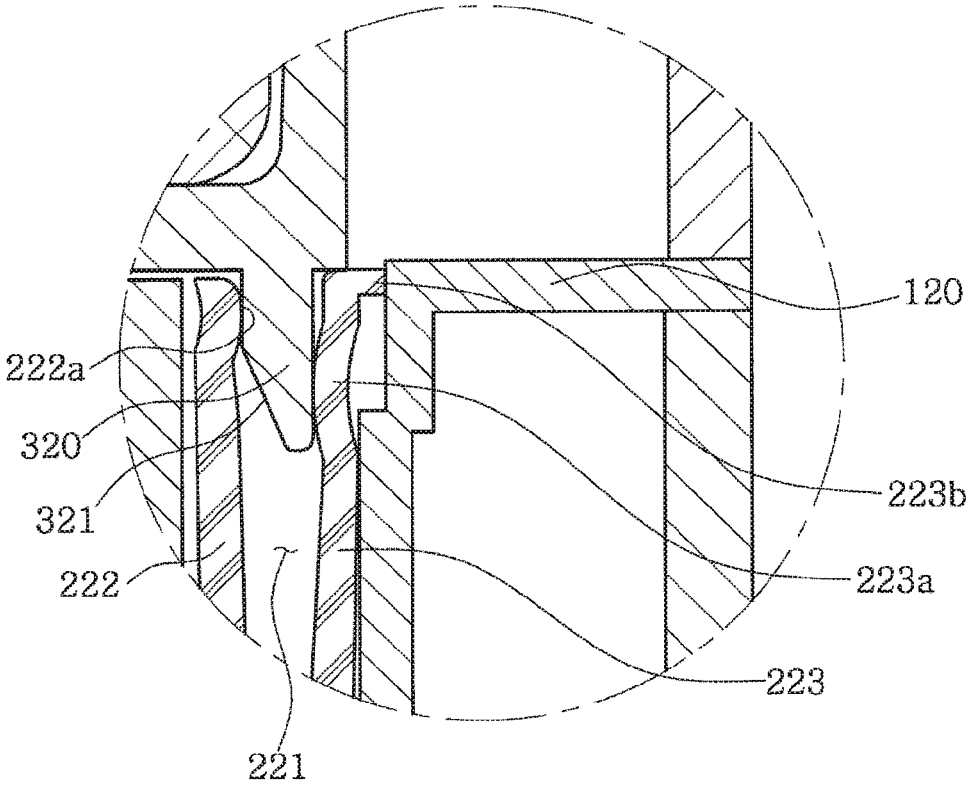
FIG. 9 is an enlarged view of portion I of FIG. 7.

As shown in an exploded perspective view of FIG. 1, assembled sectional views of FIGS. 4 and 7, and enlarged views of FIGS. 8 and 9, the airtight cosmetic container of the present invention includes: a container body 100, an inner container 200, an inner cover 300 and an outer lid 400, wherein the container body 100 and inner container 200 form a cosmetic containing part, and the inner cover 300 and the outer lid 400 form a cover part.

Here, the inner container 200 is installed in the container body 100, and the inner cover 300 is rotatably hinged to a packing case 220 of the inner container 200 by a hinge shaft 331 that connects a hinge bracket 330 of the inner cover 300 to a hinge bracket 230 formed on a side of the packing case 220, so the inner cover 300 can open and close the inner container 200.

When the inner cover 300 is closed by being rotated around the hinge bracket 330, the upper open end of the interior (cosmetic receiving chamber) of the inner container 200 is closed by the inner cover 300.

Figure 2:
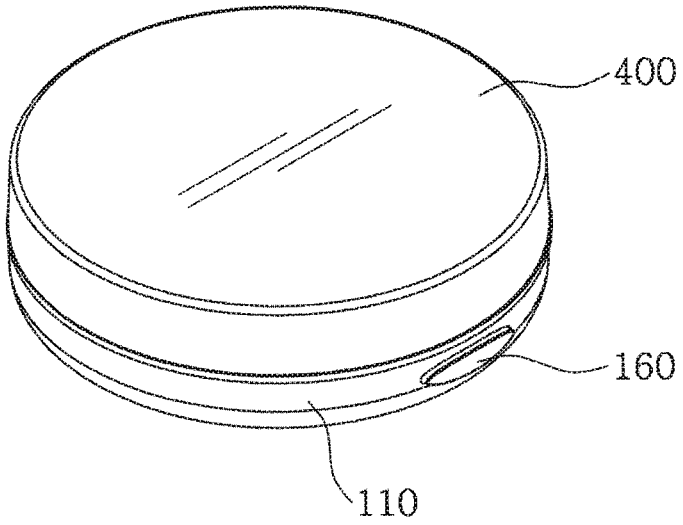
FIG. 2 is a perspective view illustrating the airtight cosmetic container of the present invention in an assembled state.

In addition, the outer lid 400 is rotatably hinged to a side recess 150 of the container body 100 by a hinge shaft 411 that connects a hinge bracket 410 of the outer lid 400 to the side recess 150. When the outer lid 400 is closed by being rotated around the hinge bracket 410 such that the outer lid 400 covers the inner cover 300, a locking protrusion 420 that is formed in the outer lid 400 by protruding at a location opposite to the hinge bracket 410 is caught by a locking step 161 of a push button 160 that is mounted to the container body 100, thereby forming a closed state of the cosmetic container as shown in FIG. 2 which is suitable for carrying or keeping the contained cosmetic.

When closing the outer lid 400, the lower surface of the outer lid 400 presses an upper pressure protrusion 310 of the inner cover 300, so the sealing rib 320 of the inner cover 300 comes into close contact with the upper surface of the inner container 200 by a pressing force of the outer lid 400, thereby airtightly sealing the inner container 200 and isolating the cosmetic material C contained in the inner container 200 from the environment.

Figure 3:
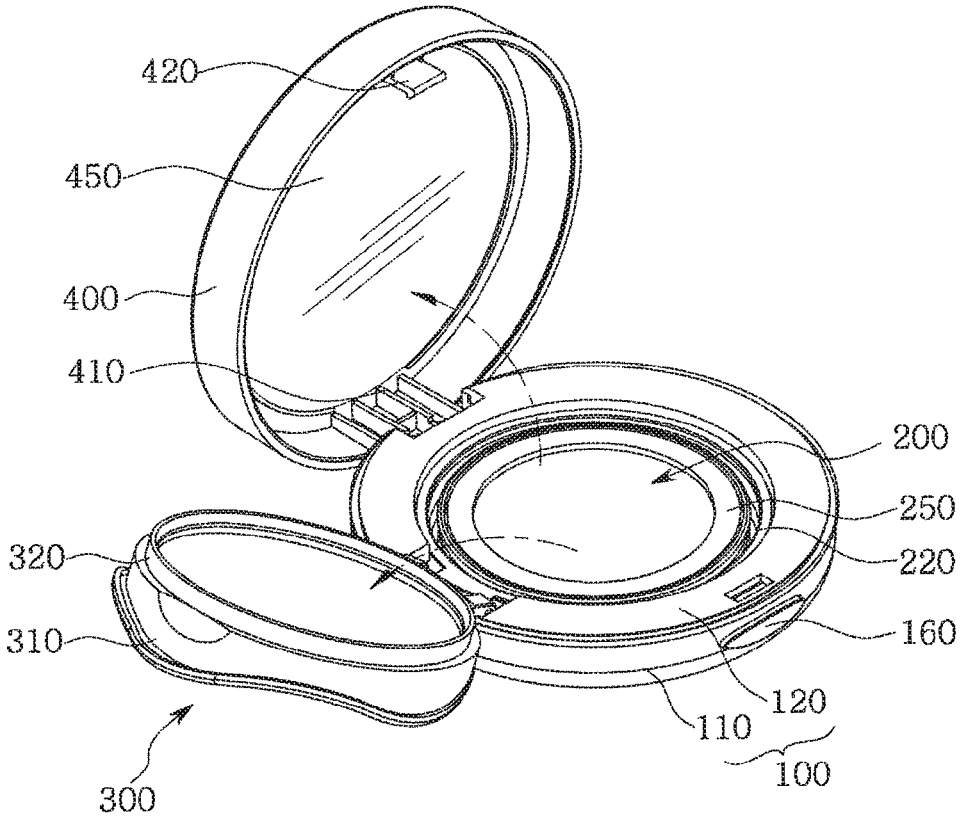
FIG. 3 is a perspective view illustrating the airtight cosmetic container of the present invention in which an outer lid and an inner cover are opened.

As shown in FIG. 3, to open the inner container 200, the push button 160 of the container body 100 is pushed, so the locking protrusion 420 of the outer lid 400 is released from the locking step 161 and the hinge bracket 410 of the outer lid 400 is rotated upward, and the outer lid 400 is primarily opened. Thereafter, the inner cover 300 is rotated upward around the hinge bracket 330, thereby finally opening the inner container 200.

Here, the pressure protrusion 310 may protrude upward from the upper edge of the inner cover 300 to a sufficient height so as to form a puff receiving chamber 340 for receiving a makeup puff 350 therein.

Further, a makeup mirror 450 may be mounted to the lower surface of the outer lid 400, so the mirror 450 can press the pressure protrusion 310 of the inner cover 300 and can be used for makeup after opening the outer lid 400.

The container body 100 includes a lower case 110 to which the push button 160 is mounted, and an outer support case 120 that is seated in a seat 111 of the lower case 110 and is provided with a through hole 121 through which the locking protrusion 420 of the outer lid 400 passes.

Here, the push button 160 is inserted through a through hole of the lower case 110, and is held in the lower case 110 in such a way that the rear end of the push button 160 is closely held on the outer circumferential surface of the outer support case 120. At a location opposite to the push button 160, the side recess 150 is formed in the lower case 110 so as to be hinged to the hinge bracket 410 of the outer lid 400 using the hinge shaft 411.

In addition, as shown in the enlarged view of FIG. 4, the outer circumferential surface of the lower part of the outer support case 120 is an uneven surface, so the outer support case 120 is tightly seated in a support ring 112 protruding upward in the seat 111 of the lower case 110 by an engagement of the uneven outer circumferential surface of the outer support case 120 with an uneven inner circumferential surface of the support ring 112.

The inner container 200 includes a cosmetic tray 210 and the packing case 220 in which the cosmetic tray 210 is seated and which has the hinge bracket 230 hinged to the hinge bracket 330 of the inner cover 300.

The packing case 220 includes inner and outer elastic sidewalls 222 and 223 that form the seal groove 221 into which the sealing rib 320 of the inner cover 300 is inserted.

Figure 6:
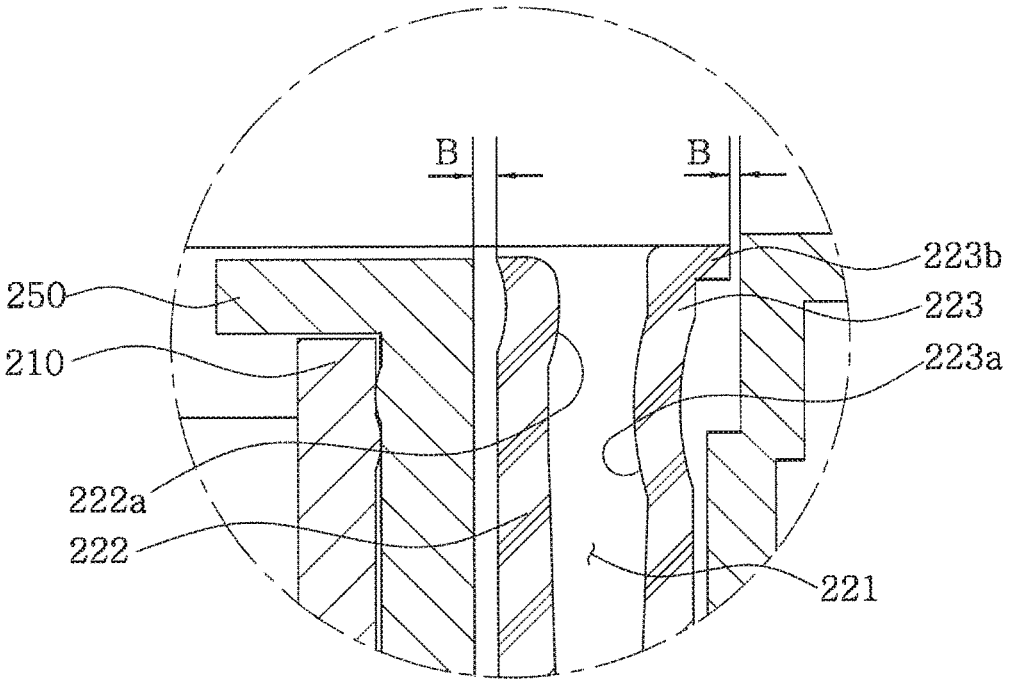
FIG. 6 is an enlarged view of portion G of FIG. 4.

Here, as shown in FIG. 6, the inner and outer elastic sidewalls 222 and 223 are provided with inner and outer curved protrusions 222a and 223a, respectively. Here, the inner and outer curved protrusions 222a and 223a oppositely protrude inward from the inner and outer elastic sidewalls 222 and 223.

Here, the inner and outer curved protrusions 222a and 223a come into elastic close contact with the inner and outer circumferential surfaces of the sealing rib 320 inserted into the seal groove 221, respectively, due to the elastic restoring force of the inner and outer elastic sidewalls 222 and 223.

The packing case 220 is seated in the seat 111 of the lower case 110 in such a way that the outer elastic sidewall 223 of the packing case 220 is held on the inner circumferential surface of the outer support case 120 of the container body 100. The inner elastic sidewall 222 of the packing case 220 has an uneven inner circumferential surface, so the uneven inner circumferential surface of the inner elastic sidewall 222 can be tightly engaged with the lower part of an uneven outer circumferential surface of an inner support case 250 that is fitted between the inner circumferential surface of the inner elastic sidewall 222 and the outer circumferential surface of the cosmetic tray 210.

Here, to allow the inner and outer elastic sidewalls 222 and 223 to be elastically opened, the inner and outer elastic sidewalls 222 and 223 are placed in such a way that a predetermined gap B is defined between the inner and outer elastic sidewalls 222 and 223 and the inner and outer circumferential surfaces of the inner and outer support cases 250 and 120.

Here, the packing case 220 may be made of a plastic material by a molding process, in which ductility and elasticity of the plastic material of the packing case 220 are higher than those of a material of the sealing rib 320 of the inner cover 300.

Figure 10:
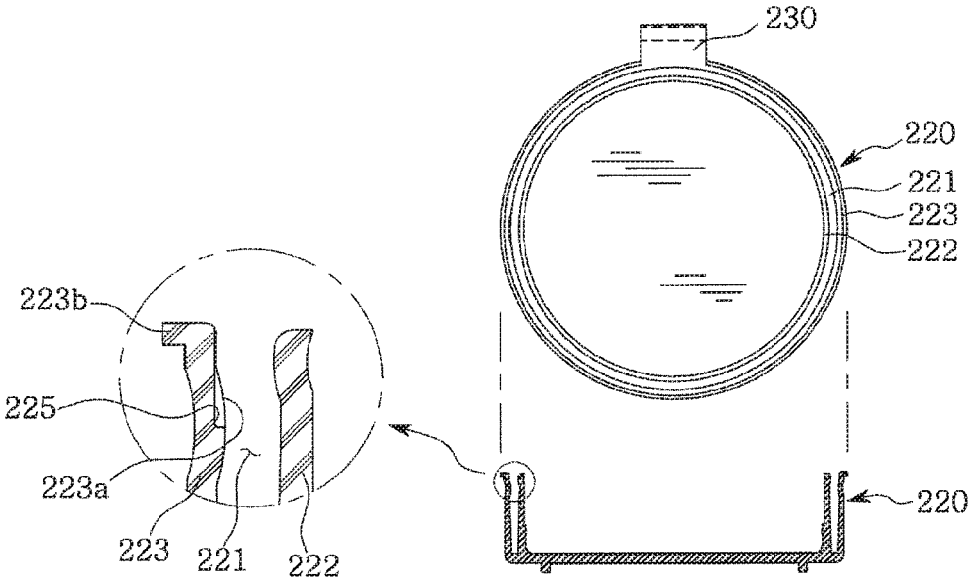
FIG. 10 is an enlarged view of a packing case of the airtight cosmetic container according to the present invention, illustrating a location of an air vent groove in the packing case.

In addition, to allow the sealing rib 320 of the inner cover 300 to further move downward in the seal groove 221 while increasing the airtight sealing effect when the outer lid 400 is finally closed and presses the inner cover 300 in a state in which the sealing rib 320 is being inserted in the seal groove 221, an air vent groove 225 is formed on the inner circumferential surface of the outer elastic sidewall 223. Here, the air vent groove 225 may extend from the upper end of the outer elastic sidewall 223 to a middle portion of the outer curved protrusion 223a, as shown in FIG. 10.

Figure 11:
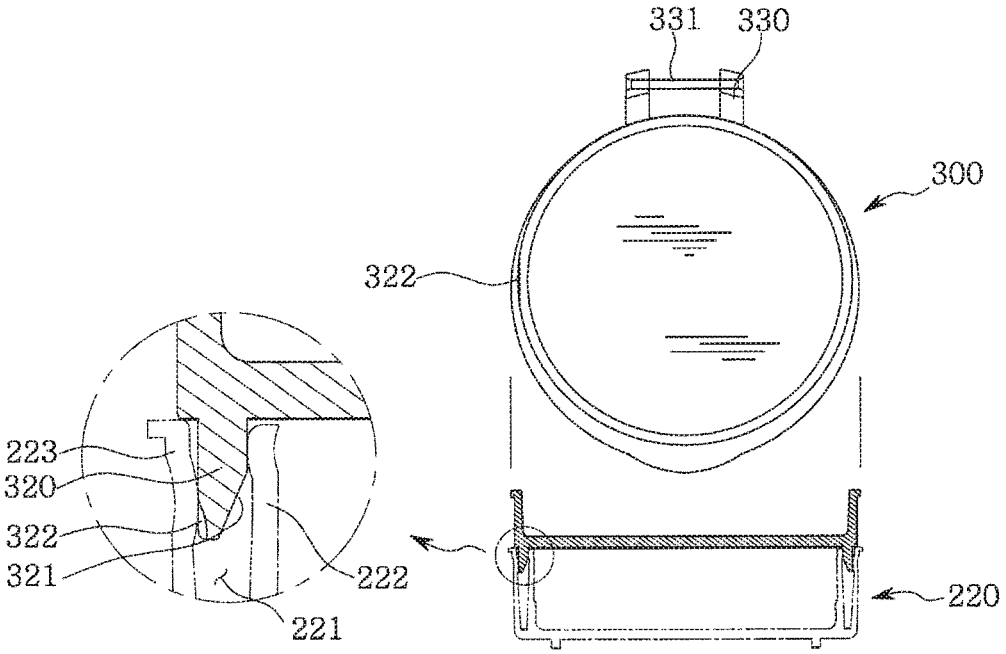
FIG. 11 is an enlarged view illustrating another embodiment of the air vent groove of the present invention in which the air vent groove is formed in a sealing rib of the inner cover.

In another embodiment, the function of the air vent groove 225 may be realized by an air vent groove formed at another location. That is, as shown in FIG. 11, an air vent groove 322 may be formed on a lower part of the outer circumferential surface of the sealing rib 320 of the inner cover 300. In this case, when the sealing rib 320 of the inner cover 300 is inserted into the seal groove 221 of the packing case 220 by the pressing force of the outer lid 400, air is expelled through a gap formed between the air vent groove 322 of the sealing rib 320 and the outer curved protrusion 223a of the outer elastic sidewall 223, thereby realizing a desired airtight sealing effect.

Further, the height of the inner elastic sidewall 222 of the packing case 220 is lower than the outer elastic sidewall 223, and a downward inclined surface 321 is formed on the inner circumferential surface of the sealing rib 320 of the inner cover 300, so the downward inclined surface 321 can come into contact with the inner curved protrusion 222a of the inner elastic sidewall 222.

Here, the inclined surface 321 is formed on the inner circumferential surface of the sealing rib 320 within a range extending from the lower end to a predetermined height of the sealing rib 320, so the thickness of the sealing rib 320 is gradually reduced in a downward direction.

Accordingly, when the sealing rib 320 of the inner cover 300 is moved around the hinge bracket 330, the inclined surface 321 of the sealing rib 320 primarily comes into contact with the inner elastic sidewall 222 of the packing case 220, so the sealing rib 320 can be easily inserted into the seal groove 221.

Further, the inner curved protrusion 222a of the inner elastic sidewall 222 is formed at a location near the upper end of the inlet of the seal groove 221, and the outer curved protrusion 223a of the outer elastic sidewall 223 is oppositely formed at a location lower than the location of the inner curved protrusion 222a with a height difference between the two curved protrusions.

When the inner and outer curved protrusions 222a and 223a are formed at respective locations with a height difference as described above, the inclined surface 321 of the sealing rib 320 can be easily and smoothly inserted into the seal groove 221 while coming into contact with the inner curved protrusion 222a.

Specifically, the inner elastic sidewall 222 of the packing case 220 is formed at a location lower than that of the outer elastic sidewall 223, and the sealing rib 320 is provided with the downward inclined surface 321 on the inner circumferential surface. Accordingly, when closing the inner cover 300, firstly, the inclined surface 321 of the sealing rib 320 comes into contact with the inner curved protrusion 222a of the inner elastic sidewall 222 at a side near the hinge shaft 331, thereby being inserted into the seal groove 221 while smoothly biasing the inner elastic sidewall 222 radially outward; and secondarily, the outer circumferential surface of the sealing rib 320 comes into close contact with the outer curved protrusion 223a of the outer elastic sidewall 223, thereby forming a desired airtight sealing effect.

When opening the inner cover 300, the sealing rib 320 is removed from the seal groove 221 while firstly the outer circumferential surface of the sealing rib 320 pushes the outer curved protrusion 223a of the outer elastic sidewall 223 so as to bias the outer curved protrusion 223a radially outward, and secondarily the inclined surface 321 comes into contact with the curved protrusion 222a of the inner elastic sidewall 222 at a location near the hinge shaft 331. Thus, when the inner cover 300 is opened and closed, the contact force can be efficiently dispersed, and the hinge shaft 331 that is set in the hinge bracket 330 of the inner cover 300 can move in the shaft hole 230a of the hinge bracket 230 of the packing case 220, so the inner cover 300 can be easily opened and closed.

A reinforcing rim 223b is formed around the upper end of the outer circumferential surface of the outer elastic sidewall 223, thereby realizing a concentric forming of the outer elastic sidewall 223 without eccentrically forming the outer elastic sidewall 223. Further, when the sealing rib 320 is inserted into the seal groove 221, the reinforcing rim 223b increases the elastic restoring force of the outer elastic sidewall 223.

Therefore, when the inner cover 300 is rotated so as to be opened or closed, the contact of the inner and outer circumferential surfaces of the sealing rib 320 with the inner and outer elastic sidewalls 222 and 223 is performed stepwise, so the opening and closing force can be efficiently dispersed. Further, during a process in which the inner cover 300 is closed, the inner and outer elastic sidewalls 222 and 223 come into close contact with the inner and outer circumferential surfaces of the sealing rib 320 at upper and lower portions due to the elastic restoring force of the inner and outer elastic sidewalls 222 and 223, so the present invention can increase the airtight sealing effect of the cosmetic container.

Figure 5:
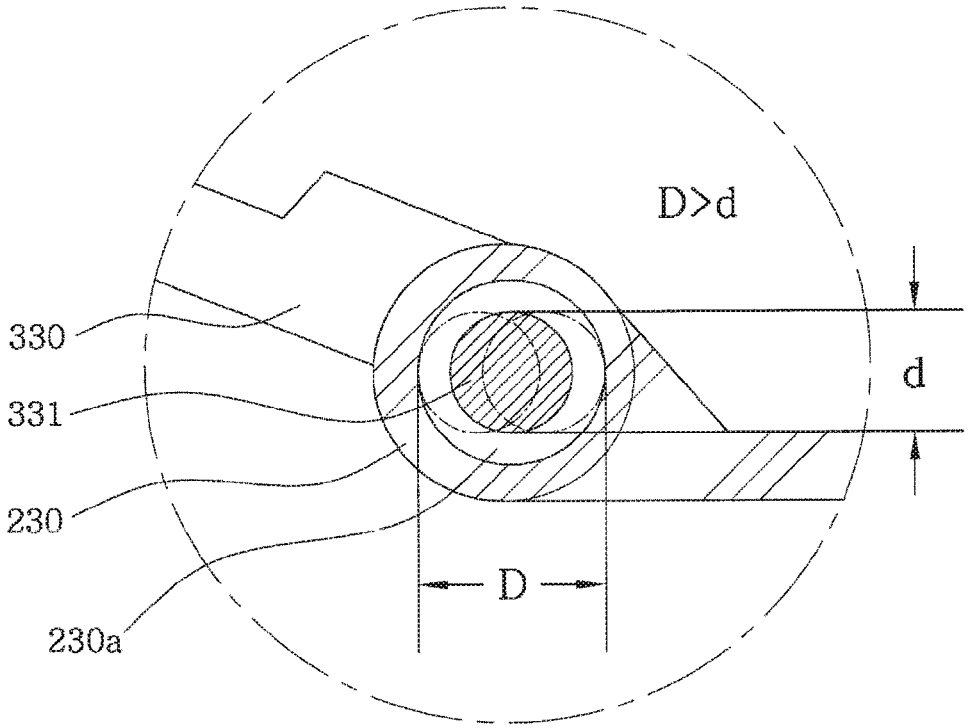
FIG. 5 is an enlarged view of portion F of FIG. 4.

As shown in the enlarged view of FIG. 5, the diameter d of the hinge shaft 331 set in the hinge bracket 330 of the inner cover 300 is smaller than the diameter D of the shaft hole 230a that is formed in the hinge bracket 230 at a side of the packing case 220, so, when the inner cover 300 is rotated so as to be closed, the hinge shaft 311 can move within the shaft hole 230a.

Thus, when the sealing rib 320 of the inner cover 300 is inserted into the seal groove 221 while coming into contact with and biasing the inner and outer elastic sidewalls 222 and 223 of the packing case 220, it is possible to compensate for a diameter deviation (diameter difference) caused by a molding error. In other words, the sealing rib 320 can be efficiently inserted into the seal groove 221 while the hinge shaft 331 moves in the shaft hole 230a of the hinge bracket 230 of the packing case 220, wherein the shaft hole 230a has the diameter D.

The above-mentioned opening and closing operation of the inner cover 300 and the operation of the packing case 220 of the inner container 200 performed accompanying with the opening and closing operation of the inner cover 300 will be described in detail with reference to FIGS. 12 to 16.

Figure 12:
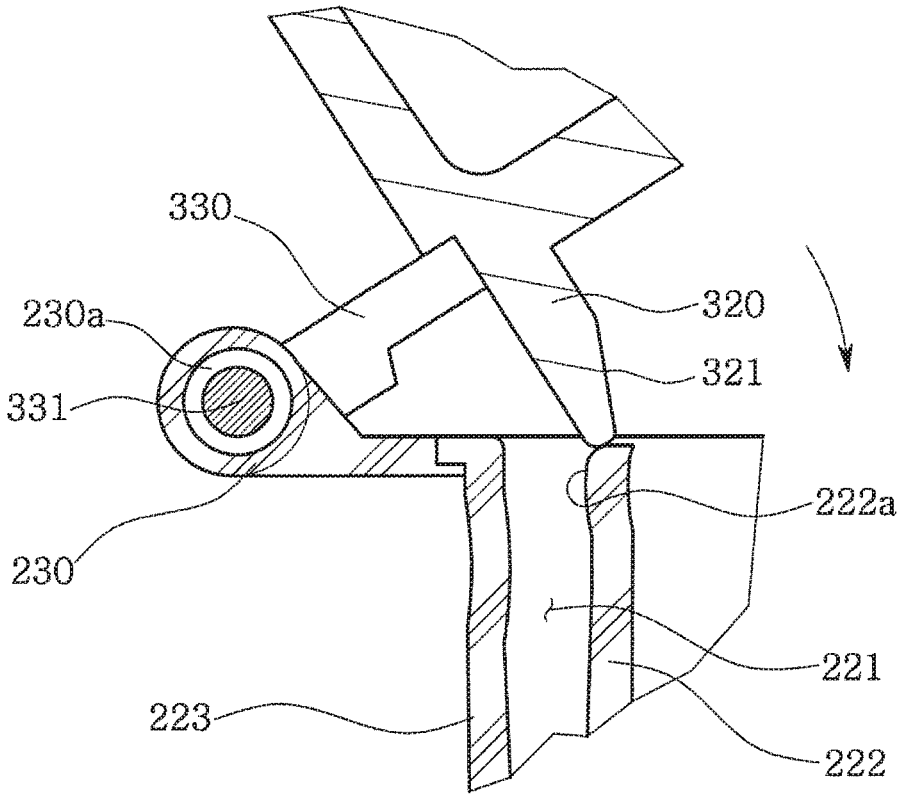
FIGS. 12 to 16 are enlarged sectional views sequentially illustrating a stepwise process when the sealing rib of the inner cover of the present invention is combined with the packing case, which is the gist of the present invention.

As shown in FIG. 12, to keep or carry the cosmetic container containing the cosmetic material C after applying the cosmetic, a user closes the inner cover 300 in a state in which both the outer lid 400 and the inner cover 300 have been opened.

When the inner cover 300 is closed as described above, the hinge cover 300 is rotated around the hinge bracket 230 of the packing case 220. Here, firstly the distal end of the inclined surface 321 of the sealing rib 320 comes into contact with the inner curved protrusion 222a that protrudes inward at a location near the upper end of the inner elastic sidewall 222 of the seal groove 221.

Figure 13:
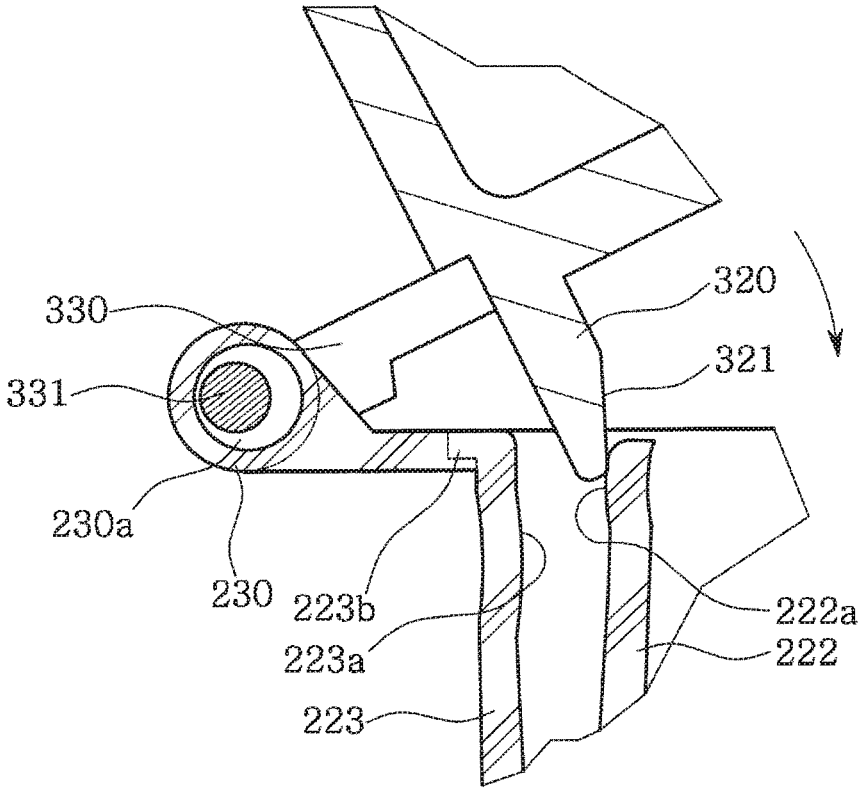

When the inner cover 300 is further rotated from the above-mentioned state, the sealing rib 320 is smoothly inserted into the seal groove 221 while the inclined surface 321 of the sealing rib 320 comes into contact with and biases the inner elastic sidewall 222 outward, as shown in FIG. 13.

Figure 14:
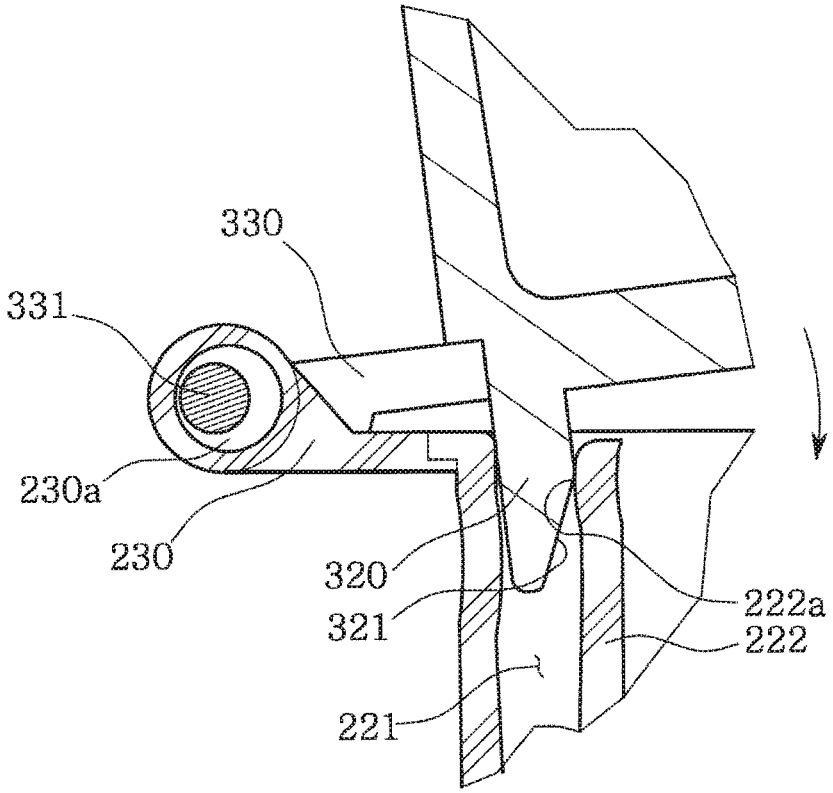

During the above-mentioned process, the sealing rib 320 of the inner cover 300 can be smoothly inserted into the seal groove 221 while the hinge bracket 330 of the inner cover 300 which is connected to the hinge shaft 331 set in the shaft hole 230a of the hinge bracket 230 of the packing case 220 can move due to the elasticity of the inner elastic sidewall 222, as shown in FIG. 14.

Figure 15:
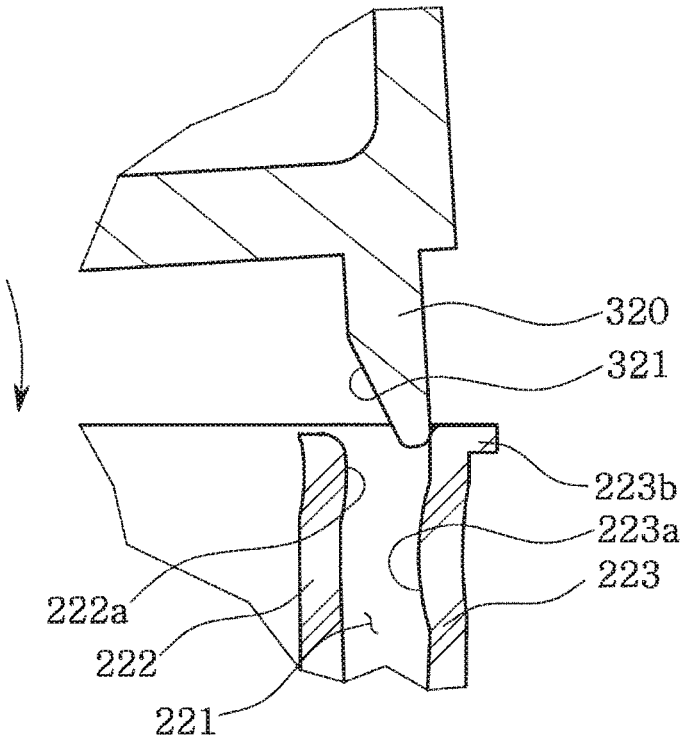
Figure 16:
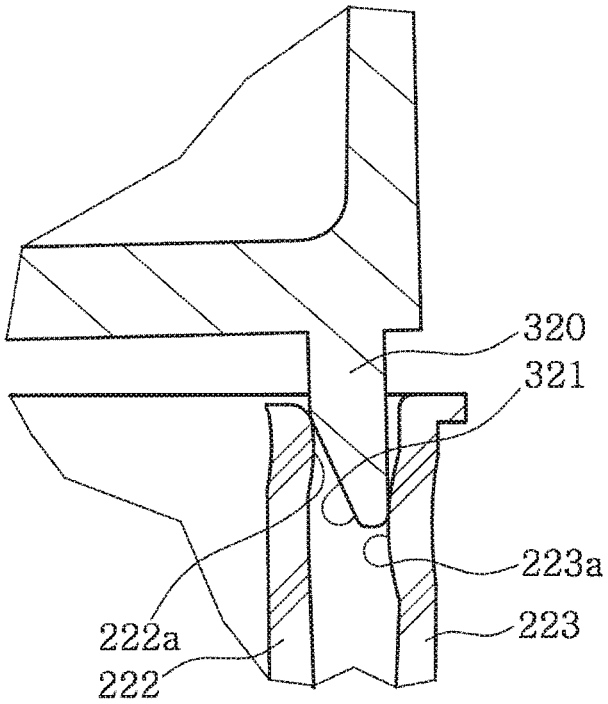

As described above, when the sealing rib 320 is inserted into the seal groove 221, the lower end of the outer circumferential surface of the sealing rib 320 primarily comes into contact with the upper end of the outer elastic sidewall 223 of the seal groove 221 which is farthest from the hinge shaft 331, as shown in FIG. 15, and secondarily comes into contact with the outer curved protrusion 223a, and the sealing rib 320 is fully inserted into the seal groove 221 while biasing and opening the outer elastic sidewall 223 outward, as shown in FIG. 16. When the sealing rib 320 is fully inserted into the seal groove 221, the sealing rib 320 is not brought into contact with the upper end of the outer elastic sidewall 223 of the packing case 220. However, due to the elasticity of the inner and outer elastic sidewalls 222 and 223, the inner and outer curved protrusions 222a and 223a of the inner and outer elastic sidewalls 222 and 223 strongly clamp the inner and outer circumferential surfaces of the sealing rib 320 while forming a desired airtight sealing effect.

When a user closes the outer lid 400 by rotating the outer lid 400 around the hinge bracket 410 in the above state, the lower surface (the mirror 450) of the outer lid 400 compresses the pressure protrusion 310 of the inner cover 300, so the inner cover 300 is moved downward while air is expelled from the cosmetic tray 210 through the air vent groove 225 formed on the inner circumferential surface of the outer elastic sidewall 223 of the packing case 220 until the locking protrusion 420 is caught by the locking step 161 of the push button 160 of the lower case 110 constituting the container body 100, thereby realizing the airtight sealing effect.

When the locking protrusion 420 is caught by the locking step 161, the inner cover 300 is further moved downward, so the lower surface of the inner cover 300 from which the sealing rib 320 extends comes into contact with the upper end surface of the outer elastic sidewall 223 of the packing case 220, thereby completely isolating the cosmetic material C contained in the cosmetic tray 210 of the inner container 200 from the environment and realizing a desired airtight sealing effect for the cosmetic material C.

When opening the inner cover 300 after opening the outer lid 400 so as to use the cosmetic material C, the inner cover 300 is rotated around the hinge shaft 331 that is set in the shaft hole 230a of the hinge bracket 230 of the packing case 220, so a portion of the outer circumferential surface of the sealing rib 320 which is farthest from the hinge shaft 331 is removed from the seal groove 221 while pushing and opening the outer curved protrusion 223a of the outer elastic sidewall 223. In the above state, the inclined surface 321 of the sealing rib 320 is removed from the seal groove 221 while coming into contact with a portion of the curved protrusion 222a of the inner elastic sidewall 222 of the packing case 220 which is nearest to the shaft hole 230a of the hinge bracket 230, so, when the inner cover 300 is opened or closed, the contact force can be efficiently dispersed As described above, when the inner cover 300 is opened or closed, the force formed by the sealing rib 320 that is removed from or inserted into the seal groove 221 of the packing case 220 can be efficiently dispersed, so the opening or closing operation can be easily performed.

Although the preferred embodiments of the present invention have been disclosed for illustrative purposes, those skilled in the art will appreciate that the present invention is not limited to embodiments described above and shown in the accompanying drawings.

For example, the present invention may be used in a threaded type opening/closing container which can be opened or closed by rotating the threaded outer lid 400 hinged to the container body 100 in a state in which the outer lid 400 is closed relative to the container body 100.

Although the preferred embodiment (s) of the present invention have (has) been disclosed for illustrative purposes, those skilled in the art will appreciate that various modifications, additions and substitutions are possible, without departing from the scope and spirit of the invention as disclosed in the accompanying claims.

<Description of the Reference Numerals in the Drawings>

| | |
|---|---|
| 100: container body | 110: lower case |
| 120: outer support case | 200: inner container |
| 210: cosmetic tray | 220: packing case |
| 221: seal groove | 222: inner elastic sidewall |
| 223: outer elastic sidewall | |
| 225, 322: air vent groove | |
| 250: inner support case | 300: inner cover |
| 310: pressure protrusion | 320: seating rib |
| 400: outer lid | C: cosmetic material |

INDUSTRIAL APPLICABILITY

As described above, the present invention provides an airtight cosmetic container that can be produced by a combination of elements made of a synthetic resin material, thereby being produced in large quantity, realizing a desired airtight sealing effect and improving quality of products without using a rubber seal.

The invention claimed is:

1. An airtight cosmetic container[,] comprising:

a container body;

an inner container installed in the container body and containing a cosmetic material therein;

an inner cover rotatably and openably combined with a side of the inner container and having a sealing rib that comes into close contact with an upper end surface of the inner container by a pressing force of a pressure protrusion; and an outer lid combined with a side recess of the container body by a hinge bracket and having a locking protrusion at a portion opposed to the hinge bracket so as to be locked to a locking step of a locking hole of a push button mounted to the container body at a portion opposed to the side recess, so, when the outer lid is closed, the outer lid brings the sealing rib into close contact with the inner container by pressing a pressure protrusion of the inner cover, and when the push button is pushed so as to release the locking protrusion, the outer lid is opened;

wherein the inner container includes a cosmetic tray[,] and a packing case in which the cosmetic tray is installed and a hinge bracket is provided so as to be combined with a hinge bracket of the inner cover[;], wherein the packing case includes *an* inner *elastic sidewall* and *an* outer elastic [sidewalls] *sidewall* that [form] *defines* a seal groove therebetween, so the sealing rib of the inner cover is inserted into the seal groove, with *at least one of an* inner *curved protrusion* and *an* outer curved [protrusions protruding toward each other on opposed surfaces of] *protrusion disposed on at least one of* the inner *sidewall* and *the* outer elastic [sidewalls so as to come into elastic close] *sidewall, respectively, wherein the outer curved protrusion is in* contact with [inner and outer circumferential surfaces of] the sealing rib inserted in the seal groove, thereby realizing an airtight sealing effect[;], wherein the container body includes a lower case to which the push button is mounted, and an outer support case that is seated in a seat of the lower case and has a through hole through which the locking protrusion of the outer lid passes[;], wherein the packing case is seated in the seat of the lower case in such a way that the outer elastic sidewall of the packing case is fitted and held in an inner circumferential surface of the outer support case, and the inner elastic sidewall of the packing case is held by an outer circumferential surface of an inner support case that is fitted over an outer circumferential surface of the cosmetic tray[;], and wherein, to allow the inner and outer elastic sidewalls to be opened, the packing case is assembled with the inner and outer support cases in such a way that a predetermined gap is defined between inner and outer circumferential surfaces of the inner and outer elastic sidewalls and inner and outer circumferential surfaces of the inner and outer support cases.

2. An airtight cosmetic container[,] comprising:

a container body;

an inner container installed in the container body and containing a cosmetic material therein;

an inner cover rotatably and openably combined with a side of the inner container and having a sealing rib that comes into close contact with an upper end surface of the inner container by a pressing force of a pressure protrusion; and an outer lid combined with a side recess of the container body by a hinge bracket and having a locking protrusion at a portion opposed to the hinge bracket so as to be locked to a locking step of a locking hole of a push button mounted to the container body at a portion opposed to the side recess, so, when the outer lid is closed, the outer lid brings the sealing rib into close contact with the inner container by pressing a pressure protrusion of the inner cover, and when the push button is pushed so as to release the locking protrusion, the outer lid is opened;

wherein the inner container includes a cosmetic tray, and a packing case in which the cosmetic tray is installed and a hinge bracket is provided so as to be combined with a hinge bracket of the inner cover;

wherein the packing case includes *an* inner *elastic sidewall* and *an* outer elastic [sidewalls] *sidewall* that [form] *defines* a seal groove therebetween, so the sealing rib of the inner cover is inserted into the seal groove, with *at least one of an* inner *curved protrusion* and *an* outer curved [protrusions protruding toward each other on opposed surfaces of] *protrusion disposed on at least one of* the inner *sidewall* and *the* outer elastic [sidewalls so as to come into elastic close] *sidewall, respectively, wherein the outer curved protrusion is in* contact with [inner and outer circumferential surfaces of] the sealing rib inserted in the seal groove, thereby realizing an airtight sealing effect[;], wherein an air vent groove is [formed on] *defined on at least one of* an inner circumferential surface of the outer elastic sidewall *and a lower part of the outer circumferential surface of the sealing rib of the inner cover, and*

*wherein the air vent groove is defined either* by extending from an upper end of the inner circumferential surface of the outer elastic sidewall to a middle portion of the outer curved protrusion, so, when the outer lid is closed, a lower surface of the inner cover comes into airtight close contact with the packing case of the inner container *or by being disposed on a lower part of the outer circumferential surface of the sealing rib of the inner cover, so, when the sealing rib of the inner cover is inserted into the seal groove of the packing case by a pressing force of the outer lid, a lower surface of the inner cover comes into airtight close contact with the packing case while air is expelled through a gap*

*formed between the air vent groove and the outer curved protrusion of the outer elastic sidewall.*

3. The airtight cosmetic container as set forth in claim 2, wherein the inner elastic sidewall of the packing case has a height lower than a height of the outer elastic sidewall, and the sealing rib of the inner cover is provided with a downward inclined surface on the inner circumferential surface thereof so as to come into contact with the curved protrusion of the inner elastic sidewall.

[4. An airtight cosmetic container, comprising:

a container body;

an inner container installed in the container body and containing a cosmetic material therein;

an inner cover rotatably and openably combined with a side of the inner container and having a sealing rib that comes into close contact with an upper end surface of the inner container by a pressing force of a pressure protrusion; and an outer lid combined with a side recess of the container body by a hinge bracket and having a locking protrusion at a portion opposed to the hinge bracket so as to be locked to a locking step of a locking hole of a push button mounted to the container body at a portion opposed to the side recess, so, when the outer lid is closed, the outer lid brings the sealing rib into close contact with the inner container by pressing a pressure protrusion of the inner cover, and when the push button is pushed so as to release the locking protrusion, the outer lid is opened;

wherein the inner container includes a cosmetic tray, and a packing case in which the cosmetic tray is installed and a hinge bracket is provided so as to be combined with hinge bracket of the inner cover;

wherein the packing case includes inner and outer elastic sidewalls that form a seal groove therebetween, so the sealing rib of the inner cover is inserted into the seal groove, with inner and outer curved protrusions protruding toward each other on opposed surfaces of the inner and outer elastic sidewalls so as to come into elastic close contact with inner and outer circumferential surfaces of the sealing rib inserted in the seal groove, thereby realizing an airtight sealing effect; and wherein an air vent groove is formed on a lower part of the outer circumferential surface of the sealing rib of the inner cover, so, when the sealing rib of the inner cover is inserted into the seal groove of the packing case by a pressing force of the outer lid, a lower surface of the inner cover comes into airtight close contact with the packing case while air is expelled through a gap formed between the air vent groove and the outer curved protrusion of the outer elastic sidewall.]

5. The airtight cosmetic container as set forth in claim [4] *2*, wherein the inner elastic sidewall of the packing case has a height lower than a height of the outer elastic sidewall, and the sealing rib of the inner cover is provided with a downward inclined surface on the inner circumferential surface thereof so as to come into contact with the curved protrusion of the inner elastic sidewall.

6. An airtight cosmetic container[,] comprising:

a container body;

an inner container installed in the container body and containing a cosmetic material therein;

an inner cover rotatably and openably combined with a side of the inner container and having a sealing rib that comes into close contact with an upper end surface of the inner container by a pressing force of a pressure protrusion; and an outer lid combined with a side recess of the container body by a hinge bracket and having a locking protrusion at a portion opposed to the hinge bracket so as to be locked to a locking step of a locking hole of a push button mounted to the container body at a portion opposed to the side recess, so, when the outer lid is closed, the outer lid brings the sealing rib into close contact with the inner container by pressing a pressure protrusion of the inner cover, and when the push button is pushed so as to release the locking protrusion, the outer lid is opened;

wherein the inner container includes a cosmetic tray[,] and a packing case in which the cosmetic tray is installed and a hinge bracket is provided so as to be combined with a hinge bracket of the inner cover[;], wherein the packing case includes *an* inner *elastic sidewall* and *an* outer elastic [sidewalls] *sidewall* that [form] *defines* a seal groove therebetween, so the sealing rib of the inner cover is inserted into the seal groove, with *at least one of an* inner *curved protrusion* and *an* outer curved [protrusions protruding toward each other on opposed surfaces of] *protrusion disposed on at least one of* the inner *sidewall* and *the* outer elastic [sidewalls so as to come into elastic close] *sidewall, respectively, wherein the outer curved protrusion is in* contact with [inner and outer circumferential surfaces of] the sealing rib inserted in the seal groove, thereby realizing an airtight sealing effect[;], wherein the container body includes a lower case to which the push button is mounted, and an outer support case that is seated in a seat of the lower case and has a through hole through which the locking protrusion of the outer lid passes;

wherein the packing case is seated in the seat of the lower case in such a way that the outer elastic sidewall of the packing case is fitted and held in an inner circumferential surface of the outer support case, and the inner elastic sidewall of the packing case is held by an outer circumferential surface of an inner support case that is fitted over an outer circumferential surface of the cosmetic tray; and wherein a lower part of an outer circumferential surface of the outer support case has an uneven surface and is combined with an uneven inner circumferential surface of a support ring protruding upward from the seat of the lower case, and wherein the packing case is seated in the seat of the lower case in such a way that the outer elastic sidewall is held in the inner circumferential surface of the outer support case, and an uneven inner circumferential surface of the inner elastic sidewall of the packing case is combined with a lower part of an uneven outer circumferential surface of the inner support case that is fitted between the inner circumferential surface of the inner elastic sidewall and an outer circumferential surface of the cosmetic tray.

*7. An airtight cosmetic container comprising:*

*a packing case including an inner elastic sidewall and an outer elastic sidewall that define a seal groove therebetween;*

*an inner cover rotatably and openably combined with the packing case and including a sealing rib corresponding to the seal groove;*

*a protrusion disposed between the packing case and the inner cover, making at least one of the inner elastic sidewall and the outer elastic sidewall to be in contact with the sealing rib; and*

*at least one air vent groove defined on an inner circumferential surface of the outer elastic sidewall by extending from an upper end of the inner circumferential surface of the outer elastic sidewall in a direction to a portion of the protrusion,*

*wherein when an outer lid is closed, air is expelled from the packing case through the at least one air vent groove and a lower surface of the inner cover comes into airtight close contact with the packing case.*

*8. The airtight cosmetic container of claim 7, wherein the at least one air vent groove is defined on the protrusion.*

*9. The airtight cosmetic container of claim 7, wherein the at least one air vent groove is defined on an outer surface of the sealing rib.*

*10. The airtight cosmetic container of claim 7, wherein the at least one air vent groove is defined on a lower part of the sealing rib.*

*11. The airtight cosmetic container of claim 7, wherein the outer elastic sidewall has higher ductility and elasticity compared with the sealing rib.*

*12. The airtight cosmetic container of claim 11, wherein, upon an insertion of the sealing rib to the seal groove, the outer elastic sidewall is elastically expanded.*

*13. The airtight cosmetic container of claim 7, wherein the packing case includes a container hinge bracket, and wherein the cover includes a cover hinge bracket which is combined with the container hinge bracket, and wherein an inner diameter (D) of a shaft hole of the container hinge bracket is larger than an outer diameter of a hinge shaft combined with the cover hinge bracket and when the hinge shaft is rotated in the shaft hole, the hinge shaft is movable in the shaft hole.*

*14. The airtight cosmetic container of claim 7, wherein the inner elastic sidewall has a height smaller than a height of the outer elastic sidewall.*

*15. The airtight cosmetic container of claim 7, wherein the sealing rib has a tapered thickness.*

*16. The airtight cosmetic container of claim 7, further comprising:*

*a container body including the packing case; and*

*an outer lid coupled to a container body and interposing the inner cover and an inner container between the outer lid and the container body.*

*17. The airtight cosmetic container of claim 16, wherein the packing case is installed in the container body and a predetermined gap is defined between outer surfaces of the outer elastic sidewall of the packing case and inner surfaces of the container body.*

*18. The airtight cosmetic container of claim 16, wherein a pressure protrusion is disposed on the inner cover being pressed by the outer lid when the outer lid is closed.*

*19. The airtight cosmetic container of claim 7, wherein the protrusion is only disposed on the outer elastic sidewall being in contact with the sealing rib.*

* * * * *